United States Patent Office 3,163,681
Patented Dec. 29, 1964

3,163,681
METHOD FOR POLYMERIZATION OF OLEFINS
Leon B. Gordon, Valparaiso, Ind., and Truman P. Moote, Jr., Tulsa, Okla., assignors to Standard Oil Company, Chicago, Ill., a corporation of Indiana
No Drawing. Original application Mar. 27, 1958, Ser. No. 724,248. Divided and this application June 30, 1961, Ser. No. 120,956
6 Claims. (Cl. 260—669)

The present invention relates to novel catalyst compositions and to their use in the polymerization of olefins. More particularly, it is concerned with the use of such catalysts in preparing olefinic polymers.

This application is a division of our copending application Serial No. 724,248, filed March 27, 1958, now U.S. No. 3,036,016 issued May 22, 1962.

We have discovered that olefin hydrocarbons such as, for example, ethylene, propylene, the pentenes, styrene, and the like, containing a terminal methylene group can be polymerized separately or conjointly under relatively mild conditions in the presence of our new catalysts to produce oils. These catalysts are composed of two components, namely a tin compound and an organometallic compound, or an alkali metal hydride of aluminum. When these components are mixed, a reaction occurs, as is evidenced by the generation of considerable heat and a darkening of the mixture, or sometimes by formation of a white precipitate. The mechanism by which such reaction takes place is unknown to us. However, it is probable that the active catalyst is in the form of a metal complex.

Preparation of our catalyst is effected in the presence of a suitable solvent usually, such as, for example, a saturated hydrocarbon, preferably boiling within a range of from about —44° to about 215° C. While certain liquid aromatics may be suitable as solvents for the prepartion of our catalyst, aromatic materials frequently tend to become alkylated with the olefin it is intended to polymerize under the conditions employed. In general it may be said that any of the well-known solvents such as chlorinated hydrocarbons, and the like, which are inert with respect to the reactants involved, and which boil generally within the above-stated range, are likewise suitable for use in the preparation of our catalyst. Such solvents also may be employed in carrying out the principal polymerization reaction.

The preferred form of the tin compound used in our invention is a tin tetrahalide, such as the tetrachloride, the tetraiodide, or the tetrabromide. However, analogous halides of tin in the divalent form may be used. In addition, various hydrocarbon derivatives of tin containing a halogen atom may be substituted for the tin halides mentioned above. As examples of such derivatives there may be mentioned dimethyl dibromostannane, dimethyl dichlorostannane, trimethyl bromostannane, and the like.

The second component involved in our new catalysts is an organometallic compound, or an alkali metal hydride of aluminum. The organometallics useful in preparing our catalyst constitute a wide variety of compounds. The metals in the organometallic compounds contemplated are taken from groups IA to IIIA and IIB of the Periodic Chart of the Elements (see 37th edition Rubber Handbook). Organometallic compounds derived from the following metals may be used in preparing the catalyst employed in the process of our invention: Li, Na, K, Rb, Mg, Al, or mixtures of such derivatives. Typical of such compounds are $NaAl(C_3H_7)H_3$, $LiC_4H_9$, $C_2H_5MgI$, phenyl magnesium bromide, $LiAl(C_2H_5)H_3$, trialkylaluminums such as triisobutylaluminum, and the like.

The aluminum hydrides, likewise constitute a large group of materials. As examples of these compounds there may be mentioned $NaAlH_4$, $LiAlH_4$, together with complex metal hydrides such as $NaAl(C_3H_7)H_3$ mentioned in the paragraph immediately above.

The third component (which is optional) of our novel catalyst system is a metal oxide such as, for example, silica-alumina, vanadium pentoxide, titania, zirconia, and the like. If desired, this third component may be added to our catalyst mixture as a support or carrier for the catalytic material. With the combination of tin halide and organometallic compound or said alkali metal hydride, we have not observed any marked difference in catalyst performance when said metal oxides are employed.

The two components making up our new catalyst may be brought together in respective molar ratios of from 100:1 to 1:100, ordinarily the preferred ratios are from 5:1 to 1:5, and we have found it particularly advantageous to use molar ratios of from 0.7:1.5.

The catalyst compositions of the type produced as outlined above, are active to form products polymerized to varying degrees.

While in most instances it is usually desirable to use olefins in as pure form as possible, mixtures of such olefins can also be employed and other substances inert under the polymerization conditions utilized can be present. For example, the crude product stream from the dehydrogenation of a normally gaseous paraffin hydrocarbon may be used directly in the process of our invention. Likewise, refinery fractions of ethylene, propylene, butylene, or mixtures of such fractions, may be used if desired. Such materials should generally be polymerized in the abesnce of contaminants which react with either the catalyst or with the reactants themselves.

Our process may be practiced over a wide range of temperatures and will be found to vary to some extent with the reactants and the activity of the catalyst. Polymerization temperatures ordinarily, however, come within a range of from about 25° to about 250° C., such as from 50° to 150° C., preferably 80° to 130° C.

The pressures utilized likewise may vary rather widely. High molecular weight olefins may be polymerized in accordance with our invention, at atmospheric pressure. If high molecular weight polymers of such olefins are desired, however, it usually is preferable to employ superatmospheric pressure. With normally gaseous olefins, superatmospheric pressure is generally desirable in order to provide an adequate concentration of olefin to contact the catalyst in the reaction medium. In general, polymerization of olefins, as practiced by our invention, may be conducted at pressures varying from atmospheric to 10,000 p.s.i.a. and above. In the majority of instances, however, pressures of the order of 15 to about 1,500 p.s.i.a. are usually preferred.

While our invention may be effected by bringing into contact the catalyst and olefin under the above-stated reaction conditions, with the olefin in the gaseous, vapor or liquid phase, we ordinarily prefer to conduct our process in the liquid phase with the aid of a solvent when necessary. This solvent should be a relatively inert substance such as saturated aliphatic hydrocarbons starting, for example, with heptane; cyclic hydrocarbons such as tetralin, cyclohexane, and the like; and ethers such as ethyl ether, butyl ether, tetrahydrofuran, 1,4-dioxane, dioxolane, and the like. Aromatic solvents such as toluene, the xylenes, the cymenes, and the like, should not be used in the process of our invention because we have found that our catalyst functions not only to promote the polymerization of olefins but likewise is capable of catalyzing the alkylation of aromatics and certain paraffin hydrocarbons.

The products produced by the process of our invention can be worked up in accordance with a variety of methods. The reaction mixture, after the run has been discontinued, is washed with dilute hydrochloric acid and then with water. This serves to decompose the catalyst and to allow the product to separate from the solution of catalyst and water in the form of an upper organic layer. Solvent, if present, also is a part of the upper layer. The latter is then separated and filtered, if suspended solids are present. The resulting clear, generally water-white solution of product in solvent is next subjected to distillation, preferably under reduced pressure, and the polymerized product is recovered either as an overhead product or as a kettle residue. Generally, kettle temperatures did not exceed 200° C. (@ 5 mm.) These oils may vary in molecular weight from about 200 to about 750 or 800. However, dimers and trimers of ethylene and propylene are also made.

Although our invention is directed primarily to the polymerization of olefins, it is also to be pointed out that our catalysts also function as isomerization catalysts. Thus we have observed that with some of the olefins such as, for example, 1-pentene, both the cis and trans 2-pentene isomers are produced in substantial amounts. Also the solvents is, to an extent, in some instances converted to various of its isomers.

The process of our invention may be further illustrated by the following specific examples:

Example 1

To a 100 ml. pressure-resistant glass flask containing 20 ml. of heptane, was added 1.1 grams of stannic chloride and then 0.48 gram of triisobutylaluminum. The flask was next closed and brought up to 50 p.s.i.g. with propylene. On addition of the latter, the temperature spontaneously rose from room temperature to 109° C. as a result of the heat of reaction. The reaction was continued for forty-eight hours, during which time the temperature was increased externally from 109° to 145° C. Thereafter, the flask was cooled and the contents were washed with concentrated hydrochloric acid followed by a water wash. The hydrocarbon layer containing solvent and product was next dried with calcium hydride and distilled to remove the solvent. As a result of this operation, 35.8 grams of liquid propylene polymer having a density; $d_4^{20°}$, of 0.8223, a refractive index; $n_D^{20°}$, of 1.4571, and a molecular weight of 384, was obtained.

Under substantially identical conditions as set forth in Example 1, stannic chloride alone was used as a catalyst and was found to be inactive.

Example 2

To a 100 ml. pressure-resistant flask containing 15 ml. of heptane, was added 4 grams of silica-alumina, 14.9 grams of tin tetrachloride and 4 grams of triisobutylaluminum. A violent reaction occurred which boiled off some of the heptane. About 38 grams of 1-pentene was then charged to the flask and the latter closed. Rapid reaction with the evolution of heat occurred. No heat was added to the reaction mixture at any time. The mixture was stirred over a period of twenty-four hours and a temperature of about 30° C. was maintained. Thereafter, the flask contents were water-washed, filtered and dried. On distillation of the dried material, up to a pot temperature of 200° C. at 20 mm. Hg, 13.3 grams of an oily yellow liquid, having a molecular weight (determined by Menzies-Wright method) of 545 was obtained as a pot residue. In the overhead from the aforesaid distillation operation, a series of fractions was taken and these various fractions analyzed by gas chromatography. These analyses showed that substantial portions, i.e., 25 to about 50 percent, of the uncoverted pentene had been isomerized to cis and trans 2-pentene. Also, quantities of n-heptane had been isomerized.

Example 3

A mixture of 4 grams of silica-alumina and 13.4 grams of tin tetrachloride was added to a 100 ml. glass flask. This flask was next cooled to a temperature of about −70° C. by means of a Dry Ice-acetone mixture. Four grams of triisobutylaluminum was next slowly added to the tin tetrachloride and silica-alumina. While the flask and contents were maintained at a temperature of about −70° C., 35 grams of 1-pentene were added, after which the flask was sealed and allowed to react at a temperature which varied from −70° C. to about 0° C. over a three-quarter hour period. By partially removing the flask from the Dry Ice-acetone bath, the temperature of the reaction mixture was permitted to rise to a temperature of 30° to 50° C. for fifteen minutes. The flask was then removed from the Dry Ice-acetone bath, and the temperature of the reaction mixture rose to 95° C. in fifteen minutes, while the pressure reached 37 p.s.i.g. The temperature then fell slowly, but the reaction was permitted to continue for a period of twenty-four hours with no heat being added at any time. Thereafter the flask was opened and the viscous yellow liquid contents were washed with water. After drying the liquid product, it was distilled to remove unpolymerized pentene. The polymeric product, which amounted to 25.6 grams, was recovered and found to have a molecular weight of 653.

Example 4

A mixture of 2 grams of stannous chloride and 2 grams of triisobutylaluminum, together with 35 grams of heptane, was added to a 100 ml. glass flask. Thereafter, propylene was introduced until a pressure of 70 p.s.i.g. had been reached, whereupon the reaction was initiated. Over a reaction period of sixteen and a half hours, a maximum temperature of 89° C. was observed. On cooling the flask and contents and after removal of solvent, a light yellow liquid polymeric product was obtained.

Example 5

To a 100 ml. pressure-resistant flask containing 50 ml. of heptane, were added 13.4 grams of tin tetrachloride and 1 gram of lithium aluminum hydride. On mixing these materials a dark color appeared. Propylene was next introduced into the flask in an amount sufficient to produce a pressure of 75 p.s.i.g. Reaction was initiated at about 50° C. Over a period of fifteen minutes, a maximum temperature of 75° C. was observed. The product was isolated in accordance with the procedure used in the previous examples. Infrared analysis of the product indicated the presence of a liquid propylene polymer.

Example 6

A mixture of 13.4 grams of tin tetrachloride and 4 grams of vanadium pentoxide was heated for about one hour at 63° C. in 50 ml. of heptane. This mixture was then transferred to a 100 ml. flask to which was next added 2 grams of triisobutylaluminum. The temperature of the mixture was then lowered to 0° to 10° C. while 36 grams of styrene were added dropwise thereto, at atmospheric pressure, over a ten minute period. Reaction, in the presence of agitation, was continued for ten minutes, after which the product was poured into water. There resulted three substantially distinct layers, the first being a water-white layer containing the solvent and some polymer, the second layer was opaque and orange in color, while the third layer was opaque and dark orange. These layers were then separated and polymeric product from each of them was recovered and molecular weight determinations made. Polymer from the first layer was found to have a molecular weight of 705; product from the second layer had a molecular weight of 1843 and polymer in the third layer had a molecular weight of 1023.

Example 7

A mixture of 13.3 grams of tin tetrachloride, 4 grams of silica-alumina, 3 grams of lithium aluminum hydride and 50 ml. of heptane, was heated at 80° to 90° C. for fifteen minutes, during which time the mixture darkened. This mixture was next transferred to a 100 ml. flask and propylene introduced to produce a pressure of 50 p.s.i.g. Polymerization continued smoothly for one hour, as shown by the slow, continuous temperature rise from about 37° to 79° C., during which there was continuous adsorption of propylene. Heat was then applied for one hour as soon as the temperature started to decrease. From a temperature level of 102° to 112° C., the pressure decreased from 50 to 43 p.s.i.g. The reaction was continued for a period of two and three-quarter hours. The resulting polymer, which was in the form of a yellow oil, was recovered as before.

Example 8

A mixture of 3.3 grams of ethyl magnesium bromide and 13.3 grams of tin tetrachloride was added to a 100 ml. glass flask containing 33 grams of dry heptane. Sufficient propylene was thereafter introduced to produce a pressure of about 50 p.s.i.g. The heat of solution of propylene in heptane resulted in an increase in temperature of the mixture to 41° C. Thereafter, heat was slowly added to a temperature of 130° C., at which a maximum pressure of about 95 p.s.i.g. was observed. At these conditions of pressure and temperature, polymerization was initiated and continued for a period of about three and a half hours, during which time the pressure within the flask decreased to about 59 lbs., indicating substantial reaction. At the conclusion of the run, the flask and contents were cooled, the solvent removed and a light yellow colored oily product recovered. Infrared analysis of this material indicated it to be an olefinic polymer.

The expression "olefinic hydrocarbon," as used herein, is intended to refer to both a single olefin and mixtures of these hydrocarbons.

While the compositions generally discussed in the foregoing description all function as polymerization catalysts, we ordinarily prefer those in which the first component is tin tetrachloride and the second component is a trialkylaluminum, such as triisobutylaluminum.

We claim:

1. In a process for the polymerization of an olefinic hydrocarbon, the improvement which comprises contacting said hydrocarbon containing a terminal methylene group under polymerization conditions with a catalyst prepared by mixing a tin halide with a member selected from the group consisting of an alkali metal hydride of aluminum, trialkyl aluminum, alkyl magnesium halide and aryl magnesium halide, said tin halide and said member selected from said group being present in respective molar ratios of from 5:1 to 1:5.

2. The process of claim 1 in which the tin halide is a tin chloride.

3. The process of claim 2 in which the tin chloride is tin tetrachloride.

4. The process of claim 2 in which the tin chloride is stannous chloride.

5. The process of claim 2 in which the organometallic compound is an aluminum alkyl.

6. The process of claim 5 in which the aluminum alkyl is triisobutylaluminum.

References Cited in the file of this patent

UNITED STATES PATENTS

| | | |
|---|---|---|
| 2,935,542 | Minckler et al. | May 3, 1960 |
| 2,953,554 | Miller et al. | Sept. 20, 1960 |